Cecil E. Laws
INVENTOR.

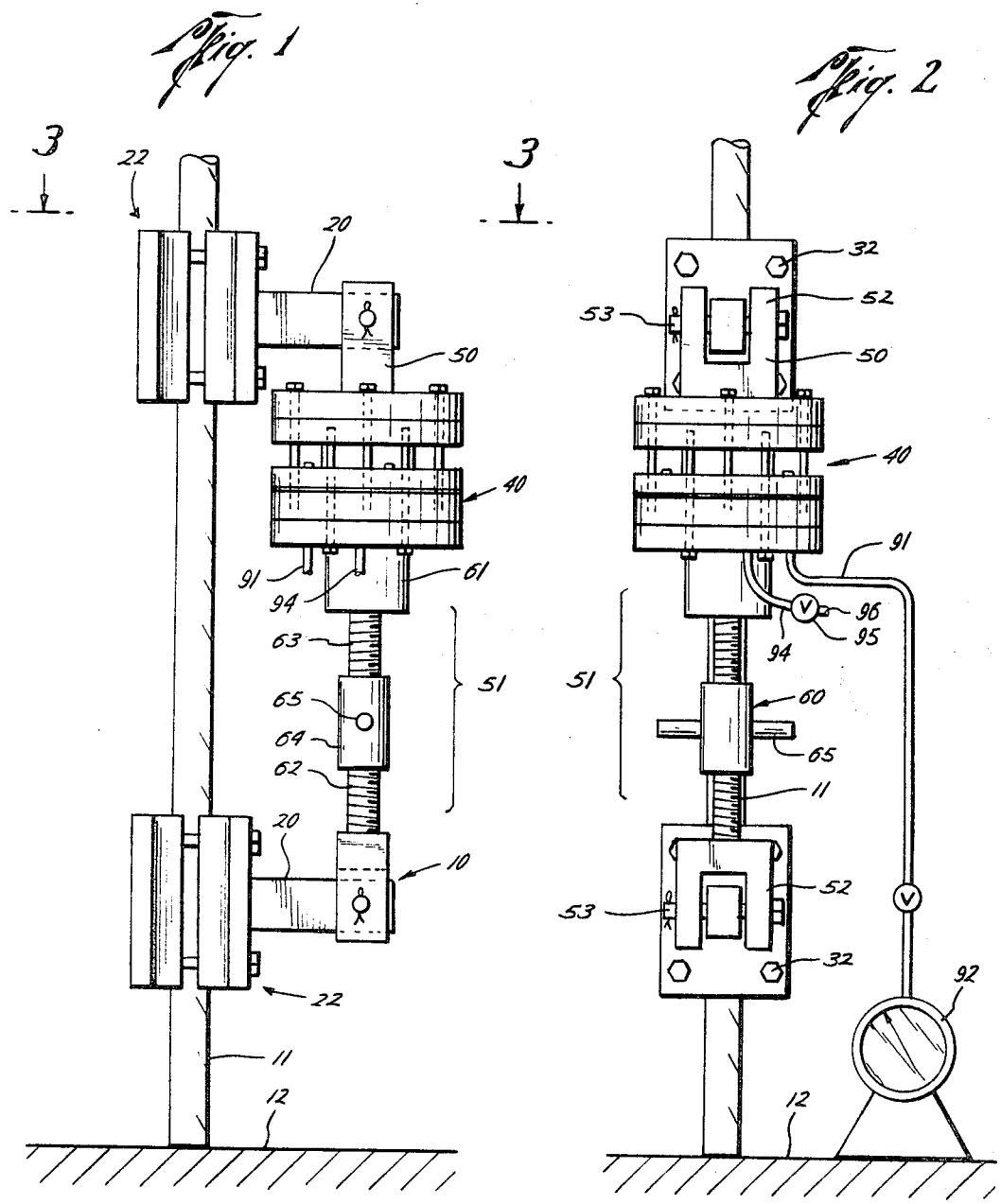

BY Murray Robinson
ATTORNEY

United States Patent Office 3,436,962
Patented Apr. 8, 1969

3,436,962
LINE TENSION SENSOR
Cecil E. Laws, Corpus Christi, Tex., assignor to National Lead Company, Houston, Tex., a corporation of New Jersey
Filed July 22, 1966, Ser. No. 567,223
Int. Cl. G01l 5/04
U.S. Cl. 73—143                     1 Claim

ABSTRACT OF THE DISCLOSURE

A cable tension measuring device having two cable attaching clamps with integral arms extending transverse to the cable and a load cell between the arms with linkage to adjust length between the arms to cause a deflection in the cable at the clamps. As tension load varies in the cable, a related force is applied to the clamps in their preset deflection and is thus transmitted to the load cell for measurement.

---

This invention pertains to line tension sensors. It is particularly suited for use in connection with drilling oil wells by the rotary method in which case it may be used to determine the weight on the bit, or to control the weight on the bit through an automatic driller.

The principal object of the invention is to provide a line tension sensor which will be stable. In certain previously known line tension sensors, variable friction between the line and the sensor caused erratic operation, but this is eliminated in the present invention.

Other objects of the invention are to provide a stable sensor which is also inexpensive to manufacture and maintain, rugged and reliable in use, simple to operate, and sensitive to small changes in line tension.

Further objects and advantages of the invention will appear from the following description of a preferred embodiment of the invention.

Briefly, the invention includes a pair of posts, means to clamp each post to the line or cable whose tension is to be measured, the posts extending transversely from the line, a tension load cell, a link pivotally connecting one side of the load cell to one post and an adjustable length line, e.g., a turnbuckle, pivotally connecting the other side of the load cell to the other post. The load cell is preferably of the hydraulic type, although it could be pneumatic or electric or of other type. Initially the clamp ends of the posts of the sensor are clamped to the line. Then the turnbuckle is tightened to draw the other (free) ends of the posts closer together. As the free ends of the posts move together, their clamped ends remain separated the initial distance due to the tension in the line. This causes the line to be slightly kinked where each clamp is attached to the line. The torque due to the kinks in the line tends to turn the posts back to their initial positions thereby imposing a tension on the load cell. The clamping means used to clamp the posts to the line have a sufficient length to keep the stress concentration between cable and clamping means below the yield point of the line, and in practice the length of each clamping means will usually be of the same order of magnitude as the length of the post connected thereto.

For a more detailed description of the invention reference will now be made to the accompanying drawings wherein:

FIGURE 1 is a side elevation of a sensor embodying the invention;

FIGURE 2 is a front elevation of the sensor shown in FIGURE 1;

Figure 3:
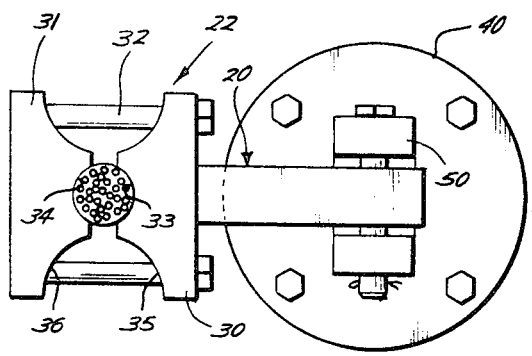
FIGURE 3 is a top view of the sensor shown in FIGURE 1.

Referring now to FIGURES 1–3 and especially to FIGURE 1, there is shown a sensor 10 connected to a line 11. The lower end of the line may be anchored, e.g. to a derrick floor indicated schematically at 12. In such case the upper end of line 11 goes to the load, not shown, which normally would be a hoist used in raising and lowering a drill string during well drilling operations. The portion of line 11 shown in such case is known as the dead ilne. However the subject sensor may be used not only in the dead line of a hoist but in any line under tension.

Sensor 10 includes upper and lower posts 20 extending transversely from line 11. Clamping means 22 connect the posts to line 11. As best shown in FIGURE 3 each clamping means includes a block 30 which is integral with the post 20 or in other manner rigidly connected thereto. The clamping means further includes a free block 31 and four threaded connector means such as screws 32 engaging threaded holes in block 31 to draw the free block and the post block together around the line 11. The blocks 30, 31 each have a longitudinal groove as shown at 33, 34 adapted to engage line 11. Outwardly from grooves 33, 34 the blocks are preferably relieved as shown at 35, 36, to save material and reduce weight. The screws 32 extend through holes in the blocks 30 and between the relieved portions of the blocks into the threaded holes in blocks 31.

As best shown in FIGURE 2, a tension load cell 40 is connected by links 50, 51 to posts 20. The connection between each link and post includes a clevis 52 and a pin 53. The pin passes through a hole in the free end of the post and extends also through holes in the clevis so as to provide a pivotal connection between post and clevis. The pin is retained in place by retention means such as cotter pins (as shown) provided at the ends of the pin.

Link 51 includes a turnbuckle 60 between its clevis portion and the portion 61 thereof (see FIGURE 1) connected to tension load cell 40. The turnbuckle includes threaded studs 62, 63 affixed respectively to the clevis portion 52 and the cell connection portion 61 of the link 51. An internally threaded nut 64 is screwed on to the ends of studs 62, 63. A pin 65 extends through the nut to facilitate its being turned.

Figure 4:
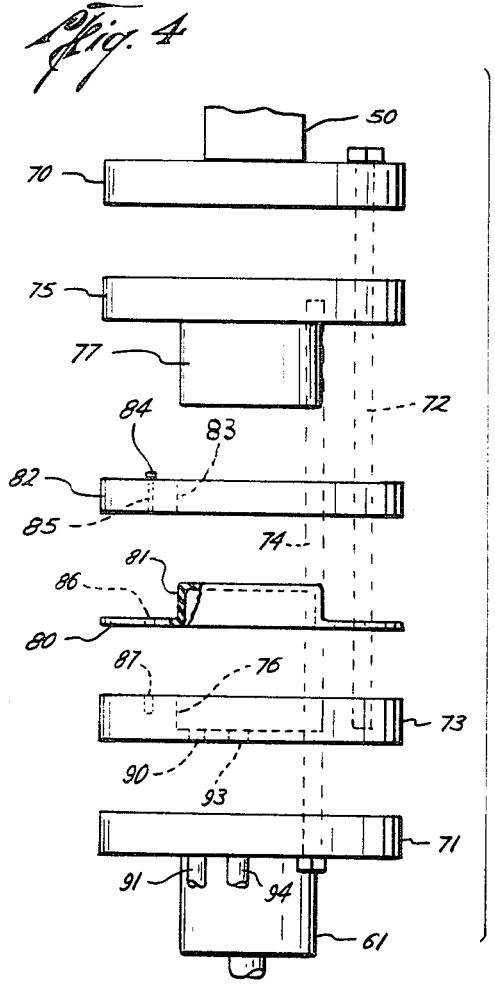
FIGURE 4 is an exploded view of a tension load cell which forms a part of the sensor shown in FIGURES 1–3.

Referring now to FIGURE 4, link 50 and portion 61 of link 51 are respectively integral with or otherwise affixed to end plates 70, 71 of the tension load cell 40. Plate 70 is connected by a plurality of screws 72 to a cylinder plate 73. The screws may, for example be four in number (see FIGURE 3) and symmetrically disposed around the cylinder axis of the cell, but for clarity only one is shown in FIGURE 4. Plate 71 is similarly connected by screws 74 to piston plate 75. Cylinder plate 73 has a cylindrical chamber 76 therein adapted to receive cylindrical piston 77 carried by plate 75.

A flexible diaphragm 80 (usually elastomeric) having a cup shaped portion 81 separates the piston 77 from the walls of chamber 76. The cup shaped portion is adapted to reverse itself when the piston bears against the bottom of the cup, thereby pressuring a fluid, e.g. light mineral oil, in chamber 76. A spacer plate 82 has a cylindrical opening 83 which guides the piston into contact with the bottom of the cup. The outer periphery of diaphragm 80 is clamped between plates 73 and 82 by means of screws 84 passing through holes 85, 86 into threaded holes 87.

A port 90 in plate 73 connects chamber 76 to a pipe 91 leading to a pressure gauge 92. A port 93 in plate 73 connects chamber 76 to a pipe 94 which is connected through a valve 95 to pipe 96. Pipe 96 may be connected to an automatic driller, not shown, for example ones such as described on pages 652 and 679 of the 1966–67 edition of the Composite Catalogue of Oil Field Equipment and Services.

Figure 5:
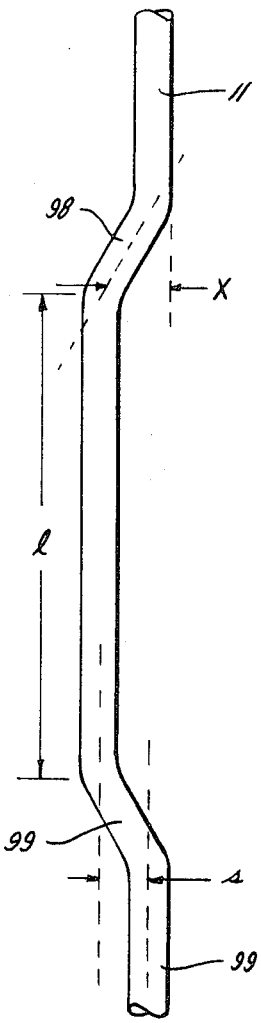
FIGURE 5 is a schematic view illustrating to an exaggerated degree the kinking of the line produced by the sensor.

It is believed that the operation and use of the tool will be clear from the foregoing description. The torque created by the kinks 98, 99 (FIGURE 5) in the line 11 produced by clamping means 22 when the turnbuckle 60 is tightened causes links 50, 51 to pull plates 73, 75 of the load cell toward each other. The resultant pressurizing of the hydraulic fluid in chamber 76 causes an indication on gauge 92 which may be calibrated to indicate line tension or bit weight or both. Also, if line 96 is connected to an automatic driller and valve 95 is open, the pressure variations in chamber 76 as the line tension changes may be used to control the hoist to slack off or tighten up the line to restore the line tension to a predetermined set value.

Since there is no sliding contact between either of the clamping means 22 and line 11, erratic operation inherent in some other forms of line tension sensors employing a sliding connection is eliminated. Both clamping means 22 fixedly secure the posts to line 11. The clamping means 22 may, for example, be six inches long in order to provide adequate static frictional engagement between the line and clamping means without excessive tightening of the screws 32. Also, the long clamping means prevent excessive stresses on the line when the turnbuckle is tightened and torque is created between posts and line. It will be apparent from the drawings, which are to scale, that the length of each clamping means may, though not necessarily, be of the same order of magnitude as the length of each post 20.

It is to be noted that since the kinking of line 11 is very slight, the spacing $s$ (FIGURE 5) between the lines of action of the forces in the line above and below each clamping means is very small unless the length of the clamping means is fairly large. The spacing $s$ multiplied by the line tension equals the torque imposed on each post 20. Assuming the posts to be approximately perpendicular to the line and coplanar as is intended, the torque on each post is also equal to the length of the post multiplied by the tension in the links 50, 51 connected to the tension load cell. Since $s$ is much smaller than the post length $h$, with only slightly kinking of the line, as is intended, the tension in the links 50, 51 will be only a small fraction $s/h$ of the line tension. In other words, the sensor only absorbs a small portion of the line tension and there is no danger of the line breaking if the load taken by the sensor is suddenly released and transferred to the line.

For small angles $x$ of kinking, e.g. usually less than five degrees, the spacing $s$ between the lines of action of the forces above and below the clamping means is substantially directly proportional to the distance the turnbuckle is shortened from its initial unstressed condition. By tightening the turnbuckle any desired fraction $s/h$ of the line tension can be transferred to the load cell. Changes under load in the length $l$ of the portion of the line between posts 20 will offset or enhance the effect of the original tightening of the turnbuckle, thereby varying the tension of the load cell. With the small angle of kinking contemplated, changes in line tension will produce proportional changes in tension on the load cell.

While a preferred embodiment of the invention has been shown and described, many modifications thereof can be made by one skilled in the art without departing from the spirit of the invention. In particular, it is to be noted that the particular load cell illustrated is a known piece of apparatus and other known types of load cell can be substituted therefor, such as compression load cells which would require lengthening the linkage instead of shortening it.

For another example, although only one link 51 is shown as being of adjustable length, it is apparent that either or both of links 50, 51 may be of adjustable length and that other means than a turnbuckle could be employed to accomplish the adjustment.

The subject sensor when used in connection with applicant's own automatic driller has been found suitable to control bit weights with a 500 pound maximum variation with hook loads ringing from 10,000 lb. to 315,000 lb., which gives an indication of the adaptability of the invention. For example with a load of 130,000 pounds on a four sheave hoist, the dead line tension is 130,000/8 or 16,333 pounds approximately, sheave friction not included. This produces a hydraulic pressure of 50 p.s.i. in the gauge of a preferred embodiment of the invention. With a diaphragm of 16 square inches area in the load cell this corresponds to a tension of 800 pounds in the turnbuckle. The load ratio is then 800/16,333=.0493 which corresponds to a kink angle $x$ of about 3 degrees in the dead line.

That being claimed is:

1. In a line tension measuring apparatus; two cable clamping means each having a substantial length in the direction of the axis of the cable and having an arm extending outward from the cable, a force measuring cell adapted to be fixed between the respective arms projecting from the clamping means, means to pivotally connect the force measuring cell between the arms projecting from the clamping means, whereby the fixing of the clamps to a cable at spaced locations will cause the arms to tend to rotate the clamps deflecting the cable so that when a tension load is applied to the cable, it causes the force measuring cell to transmit a force having a predetermined relationship to the total tension applied to the cable.

References Cited

UNITED STATES PATENTS

| | | | |
|---|---|---|---|
| 2,376,037 | 5/1945 | Davies et al. | 73—143 |
| 3,004,558 | 10/1961 | Crane | 73—143 X |

FOREIGN PATENTS

| | | |
|---|---|---|
| 139,131 | 5/1960 | U.S.S.R. |
| 174,967 | 10/1952 | Austria. |

CHARLES R. RUEHL, *Primary Examiner.*